US010175150B2

(12) United States Patent
Smith et al.

(10) Patent No.: US 10,175,150 B2
(45) Date of Patent: Jan. 8, 2019

(54) RESISTANCE COMPENSATOR TO REDUCE UNCERTAINTY IN DETERMINATION OF MOVEMENT OF A STRUCTURAL MEMBER

(71) Applicant: THE UNITED STATES OF AMERICA, AS REPRESENTED BY THE SECRETARY OF COMMERCE, Washington, DC (US)

(72) Inventors: Christopher M. Smith, Washington, DC (US); Matthew S. Hoehler, Poolesville, MD (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 171 days.

(21) Appl. No.: 15/375,793

(22) Filed: Dec. 12, 2016

(65) Prior Publication Data

US 2017/0199091 A1    Jul. 13, 2017

Related U.S. Application Data

(60) Provisional application No. 62/275,935, filed on Jan. 7, 2016.

(51) Int. Cl.
*G01R 31/20* (2006.01)
*G01M 99/00* (2011.01)

(52) U.S. Cl.
CPC .................. *G01M 99/002* (2013.01)

(58) Field of Classification Search
CPC ..... G01L 1/2281; G01M 99/002; G08B 17/00
See application file for complete search history.

(56) References Cited

U.S. PATENT DOCUMENTS

| 5,558,477 A * | 9/1996 | Browning | F16F 15/005 |
| | | | 188/380 |
| 6,249,073 B1 * | 6/2001 | Nguyen | H03H 3/0078 |
| | | | 310/309 |
| 6,677,539 B2 | 1/2004 | Miura et al. | |
| 7,332,848 B2 * | 2/2008 | Mori | H02N 2/043 |
| | | | 310/328 |
| 9,927,323 B2 * | 3/2018 | Pollock | G01M 13/045 |
| 2009/0315646 A1 * | 12/2009 | Watanabe | H03H 3/0073 |
| | | | 333/186 |
| 2017/0183217 A1 * | 6/2017 | Yin | G02B 26/02 |

* cited by examiner

*Primary Examiner* — Thang X Le
(74) *Attorney, Agent, or Firm* — Office of Chief Counsel for National Institute of Standards and Technology

(57) ABSTRACT

A resistance compensator includes: a first probe line to attach to a structural member and to provide a first combination of displacement of the structural member and an expansion of the first probe line; a second probe line connected to the first probe line and in electrical communication with the first probe line; a resistance probe in electrical communication with the first probe line and the second probe line to provide a probe signal, wherein the resistance probe is connected to the first probe line at a probe junction; a displacement member in mechanical communication with the first probe line, the displacement member to: receive the first combination from the first probe line; and produce a displacement signal comprising the displacement of the structural member, the expansion of the first probe line, or a combination thereof.

20 Claims, 14 Drawing Sheets $$L2 = L1*(1 + (a1)*(T2))$$
$$D2 = D1 + (a1)*(T2)*(L1)$$

RESISTANCE COMPENSATOR TO REDUCE UNCERTAINTY IN DETERMINATION OF MOVEMENT OF A STRUCTURAL MEMBER

CROSS REFERENCE TO RELATED APPLICATIONS

This application claims the benefit of U.S. Provisional Patent Application Ser. No. 62/275,935, filed Jan. 7, 2016, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a resistance compensator to reduce uncertainty in determination of movement of a structural member, the resistance compensator comprising: a first probe line to attach to the structural member at a point of attachment of the first probe line and to provide a first combination of displacement of the structural member and an expansion of the first probe line in response to movement of the structural member and expansion of the first probe line; a second probe line connected to the first probe line and in electrical communication with the first probe line; a resistance probe in electrical communication with the first probe line and the second probe line to provide a probe signal that depends on a resistance of the first probe line, wherein the resistance probe is connected to the first probe line at a probe junction; and a displacement member in mechanical communication with the first probe line, the displacement member to: receive the first combination from the first probe line; and produce a displacement signal comprising the displacement of the structural member, the expansion of the first probe line, or a combination comprising at least one of the foregoing.

Further disclosed is a resistance compensator to reduce uncertainty in determination of movement of a structural member, the resistance compensator comprising: a first probe line to attach to the structural member at a point of attachment of the first probe line and to provide a first combination of displacement of the structural member and an expansion of the first probe line in response to movement of the structural member and expansion of the first probe line; a second probe line connected to the first probe line and in electrical communication with the first probe line; a resistance probe in electrical communication with the first probe line and the second probe line to provide a probe signal that depends on a resistance of the first probe line, wherein the resistance probe is connected to the first probe line at a probe junction and comprises: a power source in electrical communication with the second probe line and the first probe line, the power source to electrically bias the first probe line, and a voltage member in electrical communication with the power source to measure a potential difference across the power source, and to produce the probe signal based on the potential difference; or a power source in electrical communication with the second probe line and the first probe line, the power source to provide electric current through the first probe line, and a current member in electrical communication with the power source and the first probe line to measure the electric current through the first probe line and to produce the probe signal based on the electric current through the first probe line; a displacement member in mechanical communication with the first probe line, the displacement member to: receive the first combination from the first probe line; and produce a displacement signal comprising the displacement of the structural member, the expansion of the first probe line, or a combination comprising at least one of the foregoing; an attachment fastener to receive the first probe line and the second probe line and to attach the first probe line and the second probe line to the structural member; and a coupler to receive the first probe line and to mechanically couple the first probe line to the displacement member.

Additionally disclosed is a process for determining movement of a structural member, the process comprising: attaching a resistance compensator to the structural member; providing a voltage from the power source to electrically bias the first probe line; measuring, by the voltage member, a potential difference across the power source; producing, by the voltage member, the probe signal based on the potential difference; mechanically communicating the first combination from the first probe line to the displacement member; receiving, by the displacement member, the first combination from the first probe line; producing, by the displacement member, a displacement signal in response to receiving the first combination; and analyzing the displacement signal and the probe signal to determine the movement of the structural member.

Also additionally disclosed is a process for determining movement of a structural member, the process comprising: attaching a resistance compensator to the structural member; providing the electric current from the power source to the first probe line; measuring, by the current member, the electric current through the first probe line; producing, by the current member, the probe signal based on the electric current through the first probe line; mechanically communicating the first combination from the first probe line to the displacement member; receiving, by the displacement member, the first combination from the first probe line; producing, by the displacement member, a displacement signal in response to receiving the first combination; and analyzing the displacement signal and the probe signal to determine the movement of the structural member.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a resistance compensator that includes a first probe line in electrical communication with a resistance probe reduces measurement uncertainty for an electromechanical displacement sensor in mechanical communication with a structural member disposed in a high temperature environment, e.g., a burning room. Advantageously, the coefficient of thermal expansion of the first probe line is substantially linear with respect to temperature, and a resistance determination of the first probe line by the resistance probe provides determination of a thermally induced expansion of the first probe line and movement of the structural member. Beneficially and unexpectedly, the resistance compensator provides a significant (e.g., greater than 90%) reduction in uncertainty of measurements made with electromechanical sensors for structural members disposed in harsh thermal environments that include unknown temporal or spatial variations in temperature such as fire. Surprisingly, the resistance compensator passively compensates arbitrary temperature variations along a length of the first probe line. Moreover, measuring the electrical resistance change of the first probe line in the resistance compensator provides determination of the thermal expansion of the first probe line in a high temperature environment with an unknown temperature profile, e.g., a temperature distribution that varies in space and time.

Figure 1:
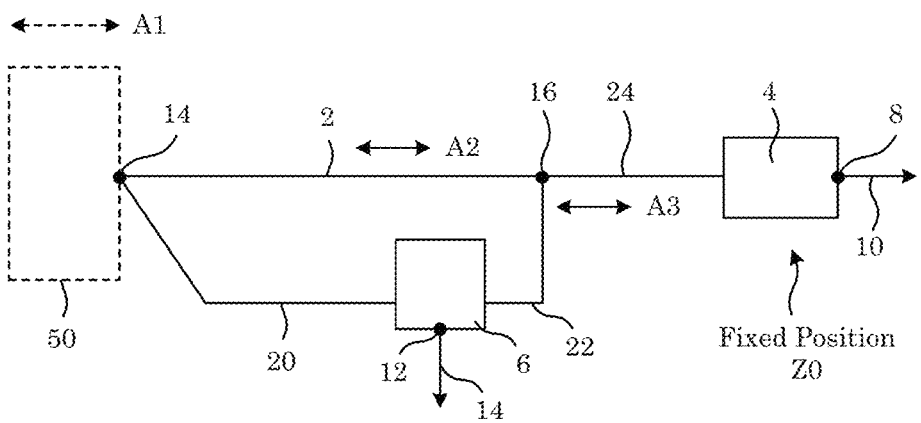
FIG. 1 shows a resistance compensator in which a second probe line is connected to a first probe line at a point of attachment of the first probe line to a structural member.
Figure 1:
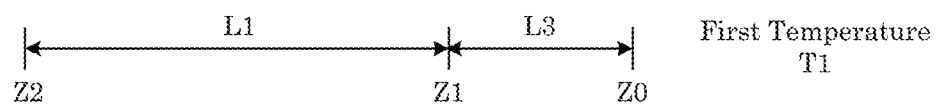
Figure 1:
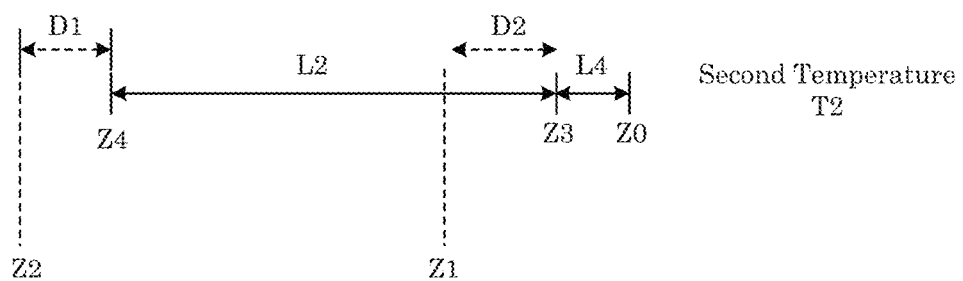

In an embodiment, with reference to FIG. 1, resistance compensator 100 includes first probe line 2 that includes a first coefficient of thermal expansion to attach to structural member 50 via first point of attachment 14 and to provide a first combination of displacement A1 of structural member 50 and a first expansion A2 of first probe line 2 in response to movement of structural member 50 and expansion of first probe line 2. Additionally, resistance compensator 100 includes second probe line 20 connected to first probe line 2 and in electrical communication with first probe line 2; resistance probe 6 in electrical communication with first probe line 2 and second probe line 20 to provide probe signal 14 at output terminal 12 that depends on a resistance of first probe line 2, wherein resistance probe 6 is connected to first probe line 2 at probe junction 16. Resistance compensator 100 also includes displacement member 4 in mechanical communication with first probe line 2, wherein displacement member 4 receives the first combination from first probe line 2 and produces displacement signal 10 at output terminal 8. Displacement signal 10 includes displacement A1 of structural member 50, expansion A2 of first probe line 2, or a combination comprising at least one of the foregoing. Here, first junction 16 is connected to displacement member 4 by linker 24. Linker 24 is subject to displacement A3 in response to a movement of first junction 16 as structural member 50 is displaced and first probe line 2 expands. In this manner, a length of linker 24 outside of displacement member 4 shortens as first junction 16 moves toward displacement member 4. Alternatively, the length of linker 24 outside of displacement member 4 lengthens as first junction 16 moves away from displacement member 4. A change of the length of linker 24 is provided by displacement member 4 either by retracting linker 24 inside of displacement member 4 (when linker 24 moves toward displacement member 4) or by providing additional length of material from displacement member 4 to extend linker 24 (when linker 24 moves away from displacement member 4).

In an embodiment, with reference to FIG. 1, second probe line 20 attaches to first probe line 2 at point of attachment 14 at structural member 50. In some embodiments, with reference to FIG. 2, second probe line 20 attaches to first probe line 2 at second junction 15, wherein second junction 15 is interposed between point of attachment 14 and first junction 16. In some embodiments, with reference to FIG. 3, second probe line 20 attaches to first probe line 2 at point of attachment 17, wherein point of attachment 17 is disposed on structural member 50 and separate from point of attachment 14 of first probe line 2. It should be appreciated that structural member 50 is electrically conductive in this embodiment such that a closed electrical circuit is formed along structural member 50 from point of attachment 14 to point of attachment 17 so that point of attachment 17 is in electrical communication with point of attachment 14 through structural member 50.

Figure 2:
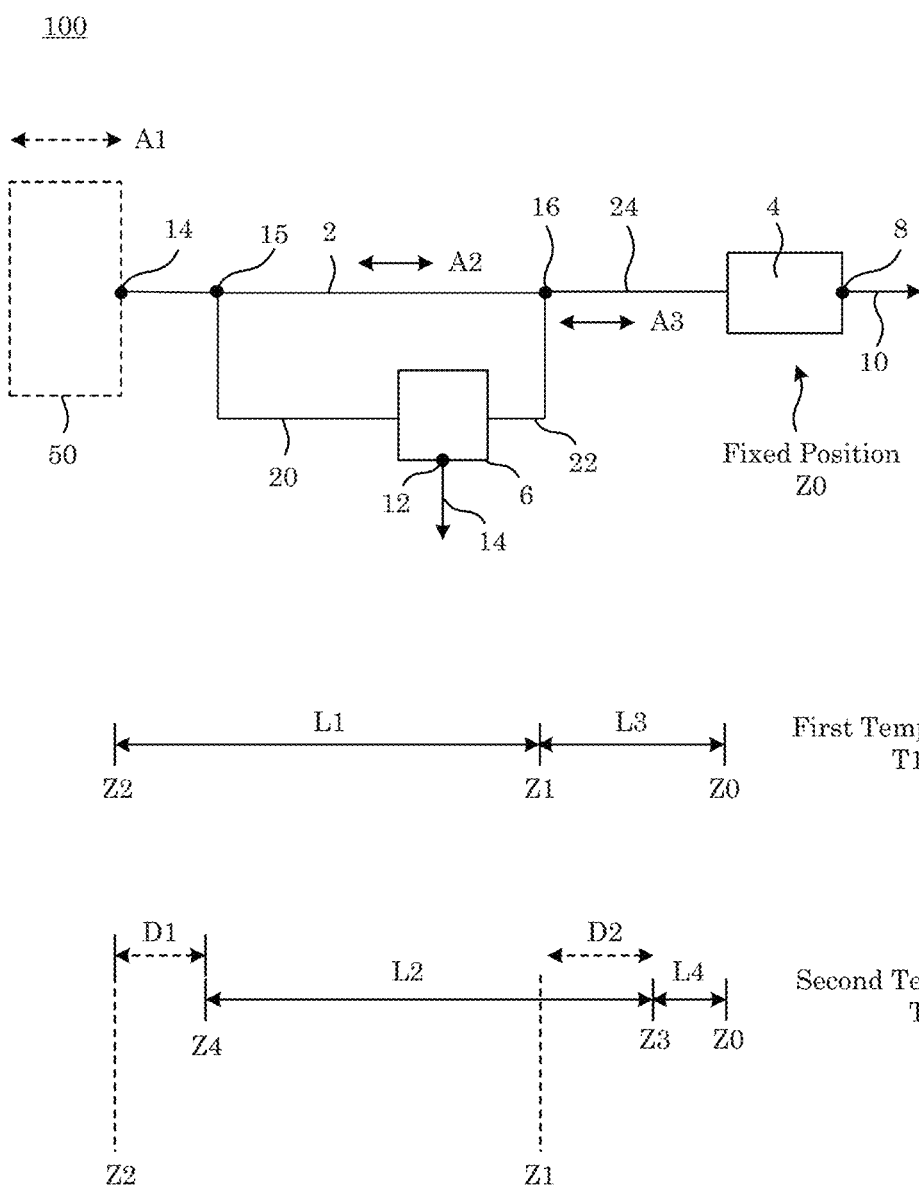
FIG. 2 shows a resistance compensator in which a second probe line is connected to a first probe line distal to a point of attachment of the first probe line to a structural member.
Figure 3:
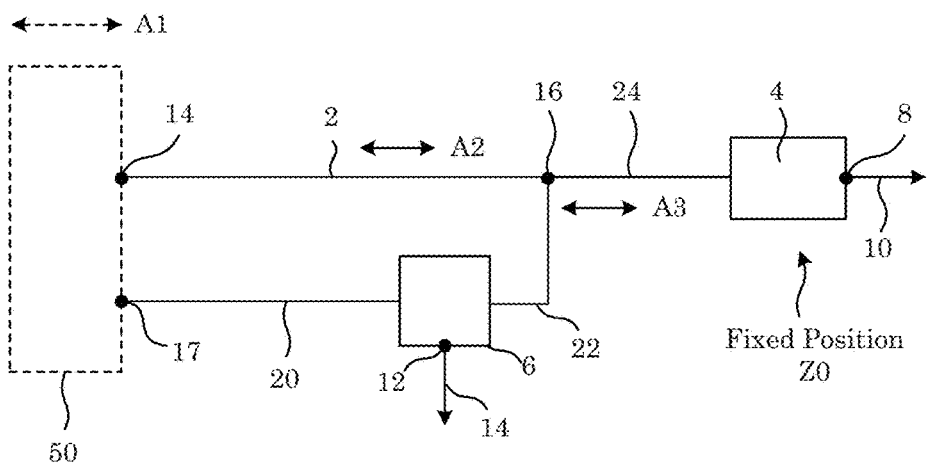
FIG. 3 shows a resistance compensator in which a second probe line and a first probe line are attached to a structural member that is electrically conductive.
Figure 3:
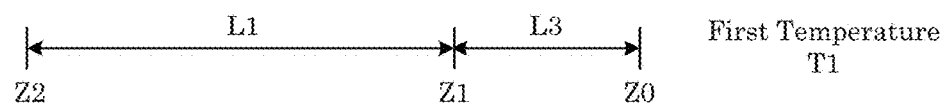
Figure 3:
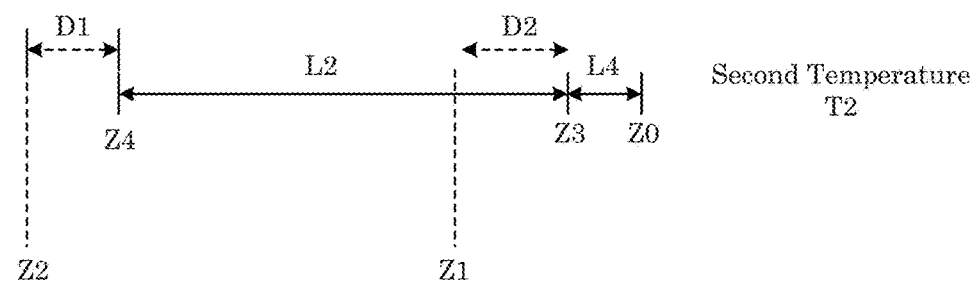
Figure 4:
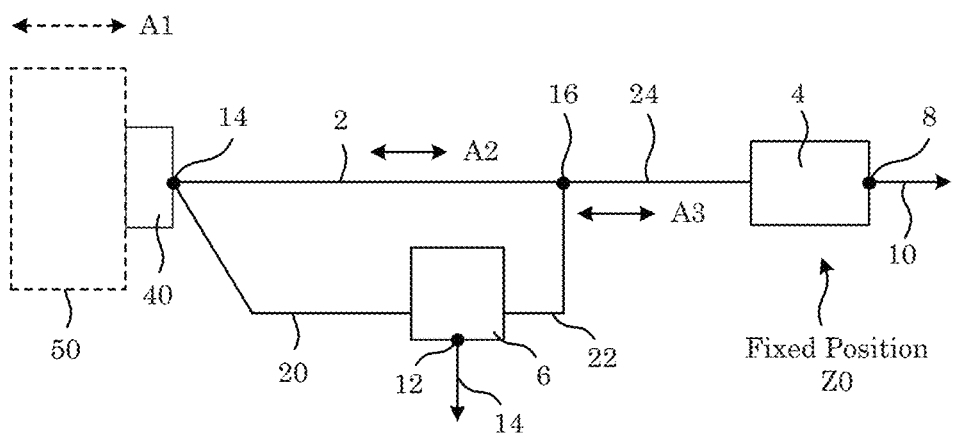
FIG. 4 shows a resistance compensator in which a first probe line is attached to a structural member via an attachment fastener.
Figure 4:
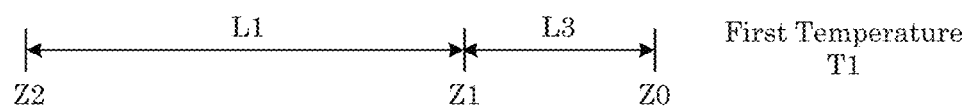
Figure 4:
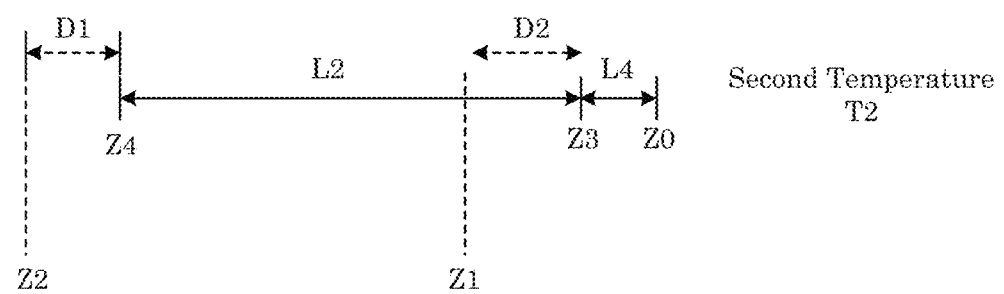

In an embodiment, with reference to FIG. 4, resistance compensator 100 includes attachment fastener 40 to receive first probe line 2 or second probe line 20. Attachment fastener 40 attaches first probe line 2 or second probe line 20 to structural member 50. In this arrangement, displacement member 4 receives displacement A1 of structural member 50 that is mechanically communicated through attachment fastener 40 and expansion A2 of first probe line 2 from which displacement member 4 produces displacement signal 10. Further, displacement member 4 remains in a fixed position as structural member 50 moves during receipt of the first combination from first probe line 2. It is contemplated that, as shown in FIG. 4, attachment fastener 40 receives first probe line 2 and second probe line 20 and attaches to structural member 50. It is contemplated that, in a configuration of first probe line 2 and second probe line 20 as shown in FIG. 2, attachment fastener 40 receives first probe line 2 and attaches to structural member 50. It is contemplated that, in a configuration of first probe line 2 and second probe line 20 as shown in FIG. 3, first attachment fastener 40 receives first probe line 2 and attaches to structural member 50, and a second attachment fastener receives second probe line 20 and attaches to structural member 50 at a different position than first attachment fastener 40.

Figure 5:
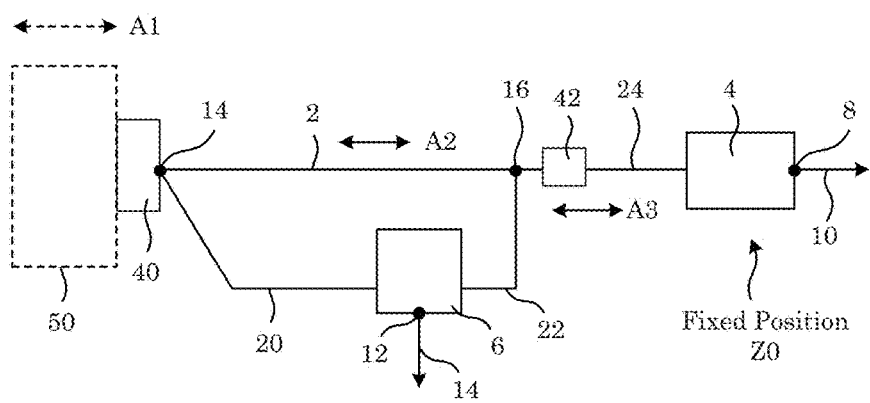
FIG. 5 shows a resistance compensator in which a first probe line is attached to a structural member via an attachment fastener and is attached to a displacement member via a coupler.
Figure 5:
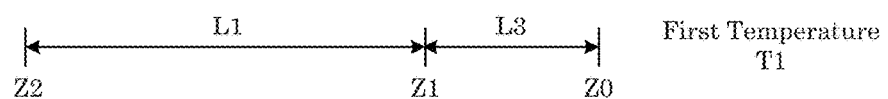
Figure 5:
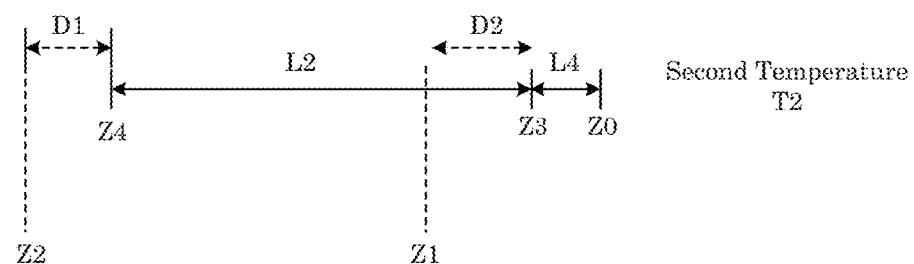

In an embodiment, with reference to FIG. 5, resistance compensator 100 includes coupler 42 to receive first probe line 2 and to mechanically couple first probe line 2 to displacement member 4. In this arrangement, first coupler 42 communicates displacement A1 of structural member 50 and expansion A2 of first probe line 2 to displacement member 4.

Figure 6:
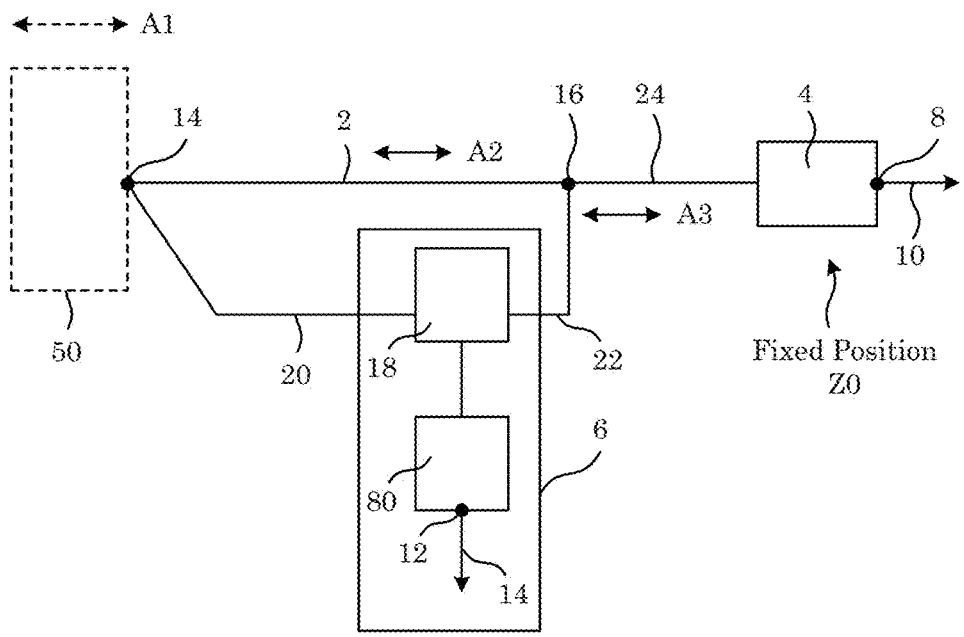
FIG. 6 shows a resistance compensator in which a resistance probe includes a voltage member.
Figure 6:
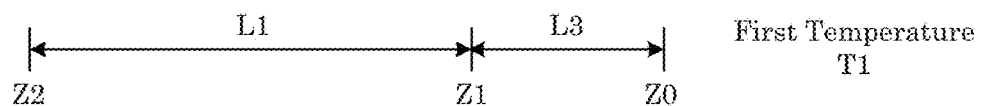
Figure 6:
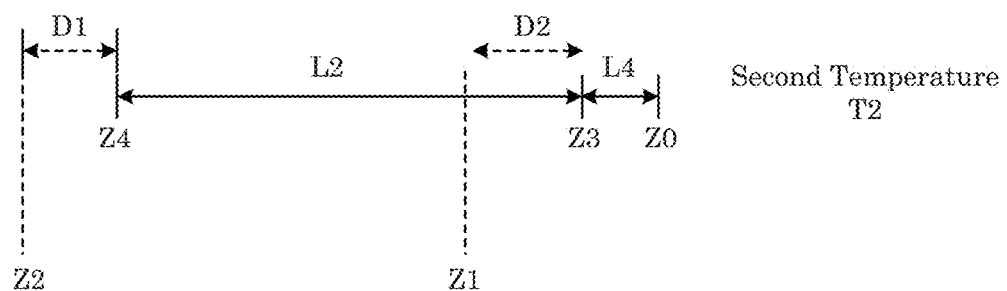

In an embodiment, with reference to FIG. 6, resistance probe 6 of resistance compensator 100 includes power source 18 in electrical communication with second probe line 20 and first probe line 2 (via third probe line 22). Power source 18 electrically biases first probe line 2. Resistance probe 6 also includes voltage member 80 in electrical communication with power source 18, wherein voltage member 80 measures a potential difference across power source 18 and produces probe signal 14 at output terminal 12. Here, probe signal 14 from voltage member 80 is based on the potential difference across power source 18, i.e., the potential difference at second probe line 20 and third probe line 22. It is contemplated that voltage member 80 is electrically connected to second probe line 20 and third probe line 22 to measure the potential difference instead of being directly connected to power source 18. The potential difference across power source 18 occurring between second probe line 20 and third probe line 22 provides determination of electrical resistance of second probe line 2. Moreover, as the electrical resistance of second probe line 2 changes in a presence of a thermal field subjected to second probe line 2, the potential difference measured by the voltage member 80 changes accordingly, and probe signal 14 reflects the change in the electrical resistance of second probe line 2.

Figure 7:
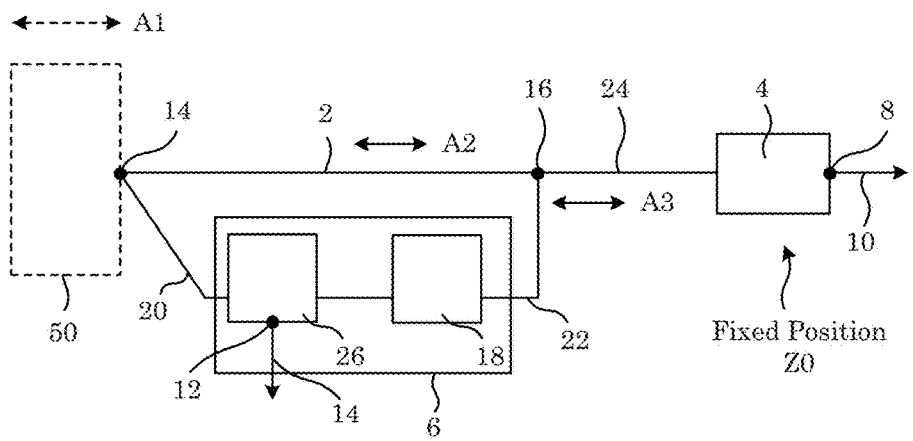
FIG. 7 shows a resistance compensator in which a resistance probe includes a current member.
Figure 7:
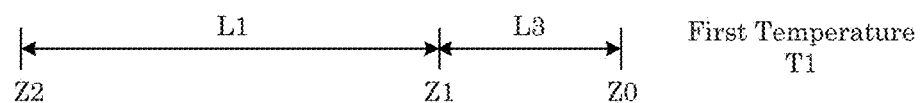
Figure 7:
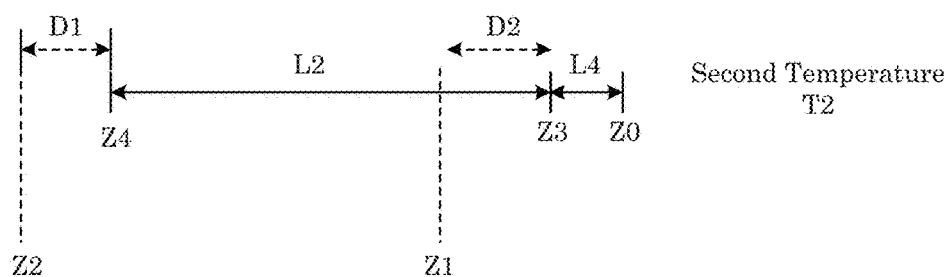

In an embodiment, with reference to FIG. 7, resistance probe 6 of resistance compensator 100 includes power source 18 in electrical communication with second probe line 20 and first probe line 2 (via third probe line 22). Resistance probe 6 also includes current member 26 in electrical communication with power source 18 and first probe line 2. Here, power source 18 provides electric current to first probe line 2, wherein the electric current flows from power source 18 through first probe line 2 and through current member 26. In this configuration, current member 26 measures the electric current through first probe line 2 and produces probe signal 14 at output terminal 12. Here, probe signal 14 from current member 26 is based on the electric current provided by power source 18 that flows through first probe line 2. It is contemplated that current member 22 can be interposed between power source 18 and second probe line 20 or can be interposed between power source 18 and first junction 16. The electric current measured by current member 26 provides determination of electrical resistance of second probe line 2. Moreover, as the electrical resistance of second probe line 2 changes in a presence of a thermal field subjected to second probe line 2, the electric current measured by current member 22 changes accordingly, and probe signal 14 reflects the change in the electrical resistance of second probe line 2.

Figure 8:
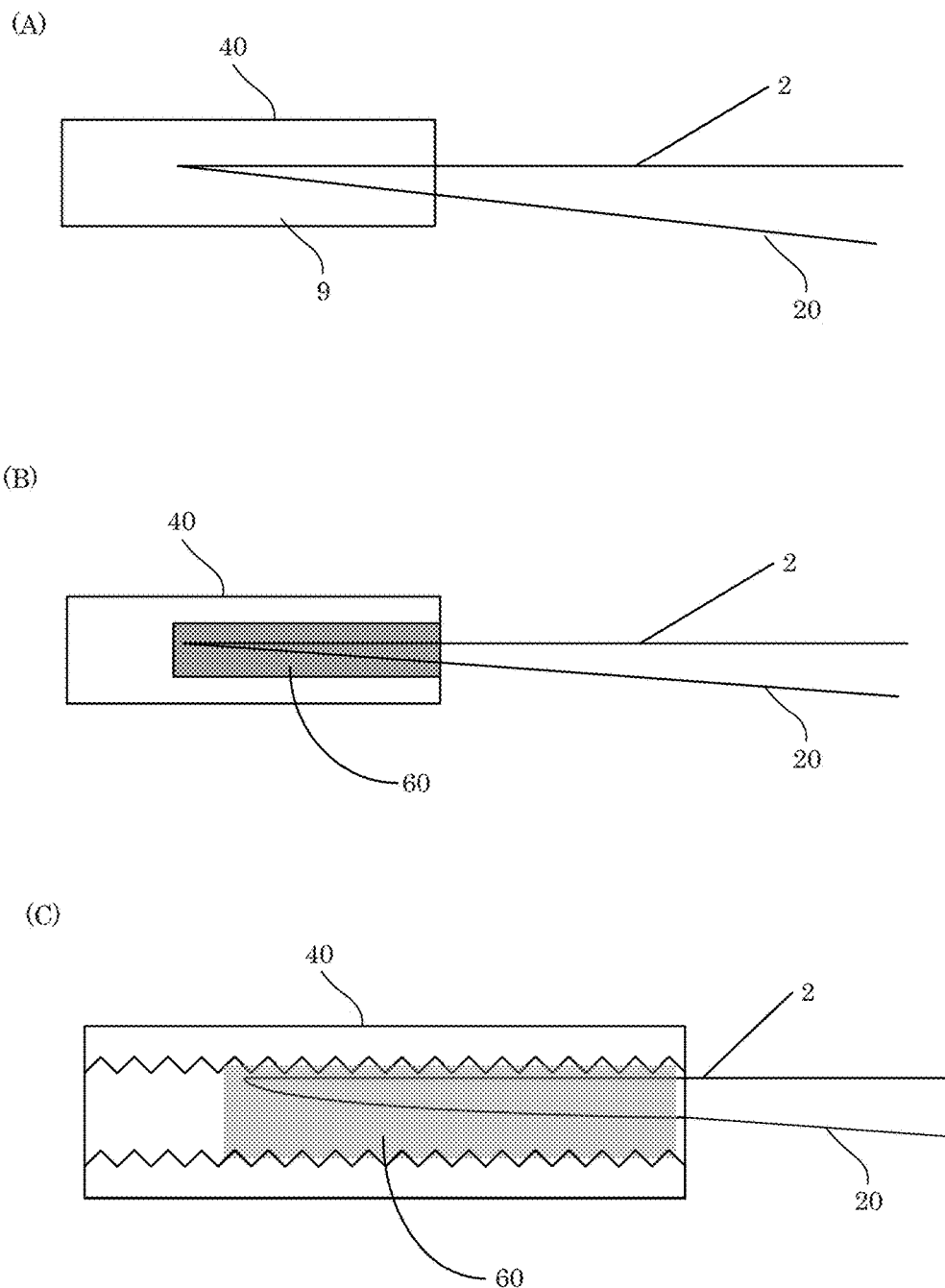
FIG. 8 shows a plurality of attachment fasteners of a resistance compensator.

Resistance compensator 100 includes attachment fastener 40 to attach first probe line 2 or second probe line 20 to structural member 50. First probe line 2 or second probe line 20 can be disposed on attachment fastener 40 physically (e.g., mechanical engagement such as interlocking, friction, and the like), chemically (e.g., bonding, alloying and the like), or a combination thereof. In an embodiment, as shown in panel A of FIG. 8, first probe line 2 and second probe line 20 are disposed in attachment fastener 40 such that body 9 of attachment fastener 40 encloses and captures terminal ends of first probe line 2 and second probe line 20. Here, attachment fastener 40 can clamp, crimp, bind, or the like first probe line 2 and second probe line 20. In an embodiment, as shown in panel B of FIG. 8, first probe line 2 and second probe line 20 are disposed in attachment fastener 40, wherein adhesive 60 bonds terminal ends of first probe line 2 and second probe line 20 to attachment fastener 40. As shown in panel C of FIG. 8, attachment member 40 can include a plurality of teeth to engage adhesive 60 that bonds first probe line 2 and second probe line 20 to attachment fastener 40. First probe line 2 and second probe line 20 can be a single probe line, or first probe line 2 and second probe line 20 can be separate probe lines that are in electrical communication, e.g., at attachment fastener 40. It is contemplated that adhesive 60 can be electrically conductive or electrically insulating. Similarly, attachment fastener 40 can be electrically conductive for electrically insulating. In this manner, structural member 50 which attachment fastener 40 contacts can be electrically insulated or in electrical communication with first probe line 2 or second probe line 20.

It is contemplated that structural member 50 is subjected to the same environmental conditions as first probe line 2. Here, attachment fastener 40 may not self-compensate its deformation, and attachment fastener 40 can include materials that have thermal and mechanical behavior that is compatible with a temperature in which first probe line 2 of differential compensator 100 is disposed. Such materials include those with low deformation and that maintain mechanical integrity and do not soften or oxidize under combustion conditions. Further, attachment fastener 40 includes material that does not detach from first probe line 2 or second probe line 20. Exemplary materials for attachment fastener 40 include metals (e.g., steel, stainless steel, nickel chromium alloys, and the like), ceramic (e.g., silicon carbide (SiC), aluminum oxide ($Al_2O_3$), and the like), and the like. Exemplary adhesives 60 include high temperature epoxies, ceramic adhesives, graphite adhesives, and the like. Moreover, first probe line 2 can be attached to structural member 50 separately from second probe line 20 with different attachment fasteners for each of first probe line 2 and second probe line 20, e.g., see FIG. 3. Further, second probe line 20 can be attached to first probe line 2 such that first probe line 2 is attached to structural member 50 without attaching second probe line 20 to structural member 50, e.g., see FIG. 2.

Resistance compensator 100 includes first probe lines 2. First probe line 2 is selected for thermal and mechanical properties in a temperature range of interest. The properties can include linear thermal expansion over the temperature range, low creep, and maintenance of mechanical integrity such as resistance to softening or oxidation. In an environment, first probe line 2 has a coefficient of thermal expansion that is a linear and positive function of temperature Moreover, a structure, a composition, and the coefficient of thermal expansion of first probe line 2 remains substantially constant from a temperature from −270° C. to 2600° C., specifically from −100° C. to 1600° C., and more specifically from 0° C. to 1400° C.

It will be appreciated that first probe line 2 is electrically conductive so that first probe line 2 has an electrical resistance that changes as a function of temperature. First probe line 2 includes a metal, a glass, a ceramic, or a combination comprising at least one of the foregoing materials. To provide electrical conduction of probe line 2, the material can be made electrically conductive by including an additive such as carbon black, metal power, or a combination thereof in the material. Exemplary materials of first probe lines 2 for use in fire environments include metal alloys (e.g., alloys that include transition metal elements such as nickel, chromium, aluminum, tungsten, zinc, iron, and the like that include, e.g., nickel-chromium, nickel-chromium-iron, nickel-molybdenum-chromium, carbides (e.g., silica-carbide), oxides ($Al_2O_3$, $Al_2O_3$—$SiO_2$, $Al_2O_3$—$SiO_2$—$B_2O_3$, and the like), nitrides (silicon nitride, titanium nitride and the like), and the like.

It will be appreciated that second probe line 20 is electrically conductive and can include an additive to provide electrical conductivity to second probe line 20. Second probe line 20 can be identical to first probe line 2 or can be different from first probe line 2. Exemplary materials of second probe line 20 include metal alloys (e.g., alloys that include transition metal elements such as nickel, chromium, aluminum, tungsten, zinc, iron, and the like that include, e.g., nickel-chromium, nickel-chromium-iron, nickel-molybdenum-chromium, carbides (e.g., silica-carbide), oxides ($Al_2O_3$, $Al_2O_3$—$SiO_2$, $Al_2O_3$—$SiO_2$—$B_2O_3$, and the like), nitrides (silicon nitride, titanium nitride and the like), and the like.

It will be appreciated that third probe line 22 is electrically conductive and can include an additive to provide electrical conductivity to third probe line 22. Third probe line 22 is selected to electrically communicate with first probe line 2 and can include metal alloys (e.g., alloys that include transition metal elements such as nickel, chromium, aluminum, tungsten, zinc, iron, and the like that include, e.g., nickel-chromium, nickel-chromium-iron, nickel-molybdenum-chromium, carbides (e.g., silica-carbide), oxides ($Al_2O_3$, $Al_2O_3$—$SiO_2$, $Al_2O_3$—$SiO_2$—$B_2O_3$, and the like), nitrides (silicon nitride, titanium nitride and the like), and the like.

In resistance compensator 100, first probe line 2 provides a mechanical link between structural member 50 and displacement member 4. Here, structural member 50 is displaced relative to displacement member 4 (which is in a fixed position) due to a stimulus such as heat from a flame or thermal conduction from a hotter body such as a floor, wall, or the like of a building as well as furnishings or fixtures in the building. Due to absorption of heat, structural member 50 expands and can be displaced toward or away from displacement member 4. The displacement (indicated by "A1" in the accompanying figures, e.g., FIG. 1, of this patent application) is communicated to displacement member 4 through first probe line 2 that spans a distance between structural member 50 and displacement member 4. First probe line 2 can be subjected to a tension force, compression force or combination thereof. Accordingly, first probe line 2 can be, e.g., a wire, cable, string, a tow of fibers, and the like to bear the tension force. It is contemplated that first probe line 2 can be a structure to bear the compression force such as, e.g., a rod, a tube, and the like.

A shape of first probe line 2 is selected so that displacement of structural member 50 is mechanically communicated from structural member 50 to displacement member 4. In an embodiment, first probe line 2 is elongated about a first axis that is orthogonal to a direction of displacement of structural member 50, and first probe line 2 has an arbitrary length in dimensions orthogonal to the first axis such as found with wire, cable, and the like. A length of first probe line 2 can be from 1 millimeter (mm) to 100 meters (m), specifically from 50 mm to 50 m, and more specifically from 500 mm to 20 m. A diameter of first probe line 2 can be from 10 micrometers (μm) to 20 mm, specifically from 100 μm to 5 mm, and more specifically from 500 μm to 2 mm.

Resistance compensator 100 can include coupler 42 to attach first probe line 2 to displacement member 4. First probe line 2 can be disposed on coupler 42 physically (e.g., mechanical engagement such as interlocking, friction, and the like), chemically (e.g., bonding, alloying and the like), or a combination thereof. In an embodiment, first probe line 2 is disposed in coupler 42 such that coupler 42 encloses and captures a terminal end of first probe line 2 proximate to displacement member 4. Here, coupler 42 can clamp, crimp, bind, or the like first probe line 2. In an embodiment, first probe line 2 is disposed in coupler 42, wherein adhesive 60 bonds the terminal end of first probe line 2 to coupler 42. Coupler 42 can include a plurality of teeth to engage adhesive 60 that bonds first probe line 2 to coupler 42. First probe line 2 can be bent to form a crook disposed in coupler 42 at the terminal end of first probe line 2 to secure first probe line 2 in coupler 42.

In some embodiments, coupler 42 is subjected to the same environmental conditions as first probe line 2. Here, coupler 42 may not self-compensate its deformation, and coupler 42 can include materials that have thermal and mechanical behavior that is compatible with a temperature in which first probe line 2 is disposed. Such materials include those with low deformation and that maintain mechanical integrity and do not soften or oxidize under combustion conditions. In certain embodiments, coupler 42 is subjected to a different environmental condition from first probe line 2. It is contemplated that while first probe line 2 is subjected to combustion conditions such as flame temperatures or oxidative conditions, coupler 42 is subjected to environmental conditions such as moderate to low temperatures or non-oxidative conditions.

Coupler 42 may not self-compensate its deformation, and coupler 42 can include materials that have thermal and mechanical behavior that is compatible with a temperature in which first probe line 2 is disposed. Such materials include those with low deformation and that maintain mechanical integrity and do not soften or oxidize under combustion conditions. Exemplary materials for coupler 42 include metals (e.g., steel, stainless steel, aluminum, and the like), non-metal (e.g., ceramic, plastic, and the like), and the like. Further, coupler 42 can include a material that does not detach from first probe line 2.

Resistance compensator 100 includes displacement member 4 that attaches to first probe line 2 and is in mechanical communication therewith. Displacement member 4 receives the first combination from first probe line 2. Displacement member 4 preloads first probe line 2 with a force. In an embodiment, the force subjected to first probe line 2 from displacement member 4 is substantially constant. Displacement member 4 can be an electromechanical displacement sensor, wherein a constant force is provided to first probe line 2, and a displacement signal is produced in response to retraction or extension of first probe line 2 in relation to a fixed position of displacement member 4. According to an embodiment, displacement member 4 includes: a transducer member in mechanical communication with first probe line 2 to produce displacement signal 22 in response to receipt of the first combination; and a tension member in mechanical communication with first probe line 2 to preload and to maintain a tension that is constant and provided to first probe line 2 when first probe line 2 is attached to structural member 50. Exemplary displacement members include a cable extension linear position transducer as disclosed in U.S. Pat. Nos. 5,236,144; 5,761,822; 6,154,975; 6,347,462; and 6,609,309 and U.S. patent application Ser. No. 12/026,792, the disclosure of each of which is incorporated by reference herein in its entirety.

According to an embodiment, displacement member 4 can include a potentiometer in mechanical communication with element 24 (e.g., a string, rod, or the like; see, e.g., FIG. 5) interposed between the potentiometer and first probe line 2 to connect to first probe line 2 and to communicate displacement of structural member 50 and expansion of first probe line 2 to displacement member 4. In some embodiments, first probe line 2 is physically attached to the potentiometer directly.

In an embodiment, resistance compensator 100 attaches to structural member 50 via first probe line 2 to communicate displacement of structural member 50 to displacement member 4 through first probe line 2. Structural member 50 is contemplated to be any solid body to which first probe line 2 can be attached. Exemplary structural members include construction elements such as beams, columns, floors and walls, the physical contents of a structure such as motors and vessels, and the like, or a combination thereof.

In an embodiment, resistance compensator 100 includes resistance probe 6 in electrical communication with first probe line 2, wherein resistance probe 6 is connected to first probe line 2 at first junction 16. First junction 16 can be a mechanical (e.g., welding, soldering, crimping, clamping and the like) or chemical (e.g., bond, spot weld, and the like) electrical interconnection between first probe line 2 and third probe line 22 to provide electrical conductivity between first probe line 2 and resistance probe 6.

In an embodiment, resistance compensator 100 includes power source 18 the supplies voltage or electrical current to first probe line 2. Power source 18 is contemplated to be an electrical component that can supply the voltage or electrical currents. Exemplary power sources include chemical sources (batteries, solar cells, and the like), mechanical sources (generators and the like) or other sources (piezoelectric, thermoelectric, nuclear), or a combination thereof.

In an embodiment, resistance compensator 100 includes voltage member 80 to measure the electrical potential across power source 18 and to determine a change in electrical resistance of first probe line 2. Voltage member 80 is any electrical component to measure electrical potential difference between two points in an electrical circuit. Exemplary voltage members include analog or digital voltmeters and the like.

In an embodiment, resistance compensator 100 includes voltage member 80 to measure the electric current through first probe line 2 provided by power source 18 and to determine a change in electrical resistance of first probe line 2, based on the electric current. Current member 20 is any electrical component to measure current in an electrical circuit. Exemplary current members include ammeters and the like.

Resistance compensator 100 can be made in various ways. In an embodiment, a process for making resistance compensator 100 includes: providing materials for first probe line 2, second probe line 20, and third probe line 22; optionally removing a portion of the material (e.g., cutting) to provide first probe line 2, second probe line 20, or third probe line 22 having a selected length, wherein the lengths of each line can be substantially identical or different; optionally heat treating first probe line 2, second probe line 20, or third probe line 22 to decrease strain or material defects; attaching first probe line 2 to attachment connector 6; attaching second probe line 20 to first probe line 2; and attaching third probe line 22 to first probe line 2; attaching first probe line 2 to displacement member 4; and connecting resistance probe 6 to second probe line 20 and third probe line 22. The process also can include attaching first probe line 2 to coupler 42 that is attached to displacement member 4.

In the process, heat treating first probe line 2 includes heating first probe lines 2 to a temperature at which first probe line 2 is exposed during use of resistance compensator 100. In an embodiment, heat treating is performed in environment in which first probe line 2 is not subject to oxidation. Here, the environment conditions can be provided by disposing first probe line 2 in a vacuum chamber that is evacuated or filled with inert gases in an absence of a gas or condensed phase matter that oxidizes first probe line 2 to avoid oxidation during heat treating. Further, first probe line 2 can be cooled at a moderate rate to avoid oxidation after heat treating.

In the process, attaching first probe line 2 to attachment fastener 40 can be accomplished by adhering first probe line 2 to attachment fastener 40 such as by wetting first probe line 2 with water (e.g., for ceramic fiber tows for first probe line 2), bending a crook in the terminal end of first probe line 2, inserting the crooks into attachment fastener 40 (e.g., a threaded coupling nut), and disposing a high-temperature ceramic adhesive into an interior volume of attachment connector 6. Attachment fastener 40 can be vibrated, e.g., ultrasonically, to remove gas bubbles from the adhesive, and the adhesive can be cured to fixedly disposed first probe line 2 to attachment fastener 40. The remaining free end of first probe line 2 can be attached to coupler 42, e.g., with an adhesive such as a glue or epoxy.

The processes and articles herein have numerous beneficial uses, including a process for determining movement of a structural member. In an embodiment, the process for determining movement of a structural member includes: attaching the resistance compensator 100 to the structural member 50 such that first probe line 2 is attached to structural member 50; attaching second probe line 20 to first probe line 2; providing a tension on first probe line 2 from displacement member 4; providing a voltage from power source 18 to electrically bias first probe line 2; measuring, by voltage member 80, a potential difference across power source 18; producing, by voltage member 18, probe signal 14 based on the potential difference; mechanically communicating a first combination from first probe line 2 to displacement member 4, the first combination including: a displacement of structural member 50 in response to movement of structural member 50; and a first expansion of first probe line 2 in response to expansion of first probe line 2; receiving, by displacement member 4, the first combination from first probe line 2; producing, by displacement member 4, displacement signal 10 in response to receiving the first combination; and analyzing displacement signal 10 and probe signal 14 to determine the movement of structural member 50. Displacement signal 10 can include the displacement of structural member 50, the first expansion of first probe line 2, or a combination comprising at least one of the foregoing.

In an embodiment, the process for determining movement of a structural member includes: attaching the resistance compensator 100 to the structural member 50 such that first probe line 2 is attached to structural member 50; attaching second probe line 20 to first probe line 2; providing a tension on first probe line 2 from displacement member 4; providing the electric current from power source 18 to flow electric current through first probe line 2; measuring, by current member 26, the electric current through first probe line 2; producing, by current member 26, probe signal 14 based on the electric current through first probe line 2; mechanically communicating a first combination from first probe line 2 to displacement member 4, the first combination including: a displacement of structural member 50 in response to movement of structural member 50; and a first expansion of first probe line 2 in response to expansion of first probe line 2; receiving, by displacement member 4, the first combination from first probe line 2; producing, by displacement member 4, displacement signal 10 in response to receiving the first combination; and analyzing displacement signal 10 and probe signal 14 to determine the movement of structural member 50. Displacement signal 10 can include the displacement of structural member 50, the first expansion of first probe line 2, or a combination comprising at least one of the foregoing.

Figure 9:
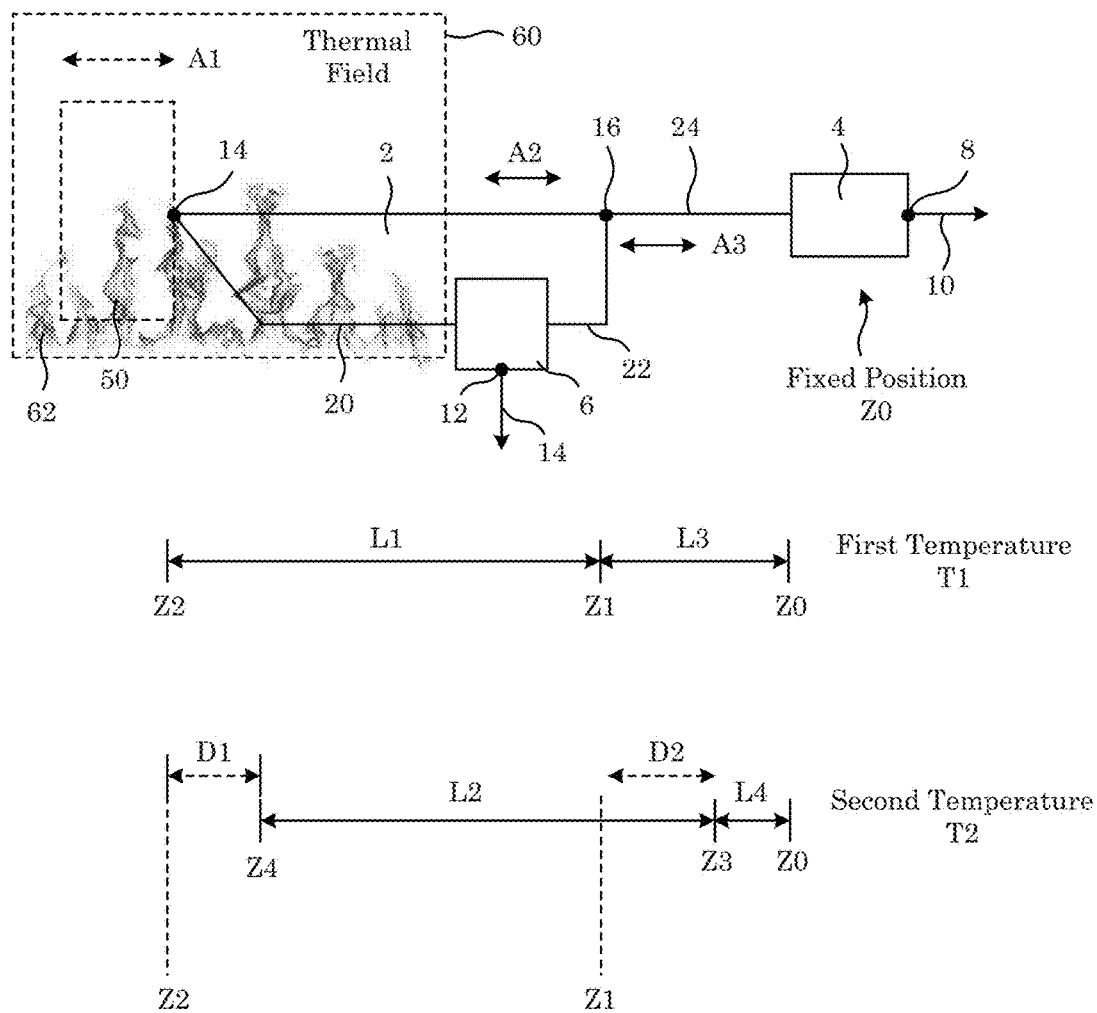
FIG. 9 shows a resistance compensator disposed in a thermal field.

As shown in FIG. 9, during the process for determining movement of a structural member, resistance compensator 100 can be attached to structural member 50 such that a portion of first probe line 2, a portion of second probe line 20, attachment connector 6, and structural member 50 are disposed in a thermal field 60 that includes flames 62 or other elevated temperature heat source. Further, the temperature distribution along first probe line 2 can be different such that different portions of first probe line 2 can be subjected to different temperatures, wherein a gradient in temperature is present along first probe line 2.

In the process for determining movement of a structural member, attaching first probe line 2 or second probe line 20 to structural member 50 can include attaching attachment connector 40 to structural member 50 via physical attachment (e.g., bolting, clamping, welding, and the like) or chemical attachment (e.g., bonding, adhering, and the like).

The process can include securing displacement member 4 to a fixed point of reference so that displacement member 4 does not move and can monitor the movement of structural member 50. Securing displacement member 4 can include attaching displacement member 4 to an immobile body such as a non-moving platform mechanically (e.g., by bolting, clamping, welding, and the like) or chemically.

Figure 10:
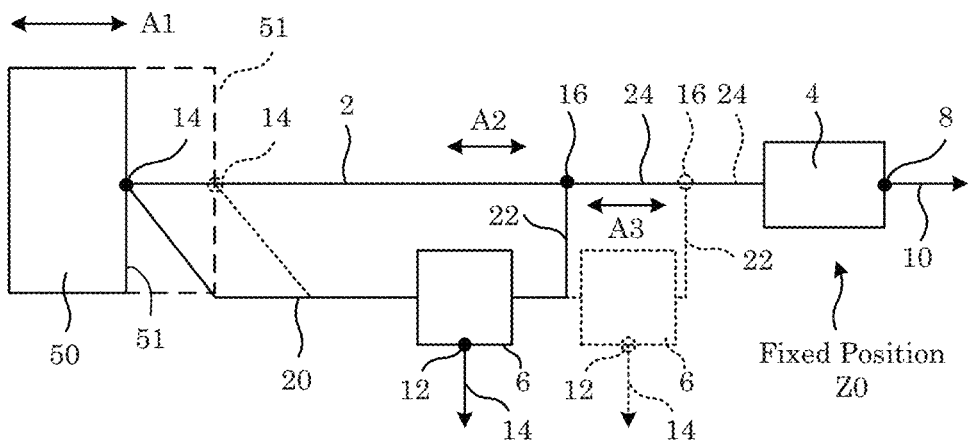
FIG. 10 shows a result displacement of the structural member and expansion of the first probe line of the resistance compensator shown in FIG. 9 in response to disposal of the resistance compensator in the thermal field.
Figure 10:
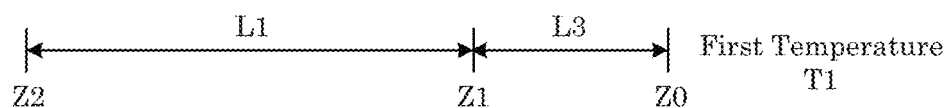
Figure 10:
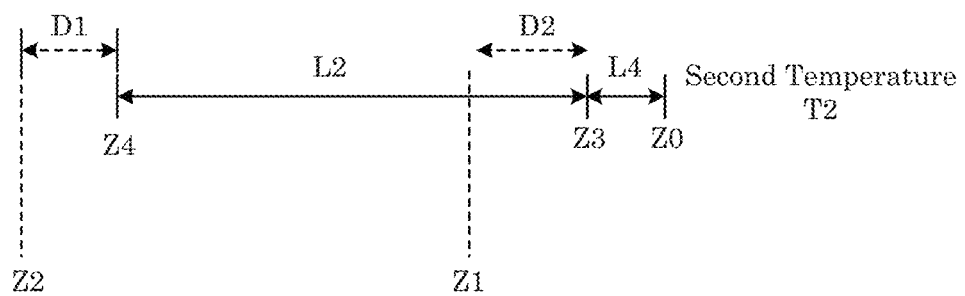

With reference to FIG. 10, at first temperature T1 (relative to second temperature T2, wherein T1<T2), structural member 50 includes surface 51 located at position Z2 and to which first probe line 2 is attached at point of attachment 14. First probe line 2 has length L1 and extends from point 14 at position Z2 to junction 16 at position Z1.

In a presence of the heat source, e.g., flames 62, that provides second temperature T2, surface 51 of structural member 50 is displaced by distance D1 such that structural member 50 appears to have moved by distance D1 from position Z2 to position Z4 with respect to displacement member 4 attached to first probe line 2. Also, first probe line 2 expands due to absorption of heat from the heat source. Because first probe line 2 has coefficient of thermal expansion a1, first probe line 2 lengthens by amount a1*T2*L1. Accordingly, junction 16 of first probe line 2 attached to displacement member 4 is displaced from location Z1 to location Z3 by distance D2=D1+(a1*T2*L1), wherein a length of first probe line after displacement is L2=L1*(1+(a1)*(T2)).

Figure 11:
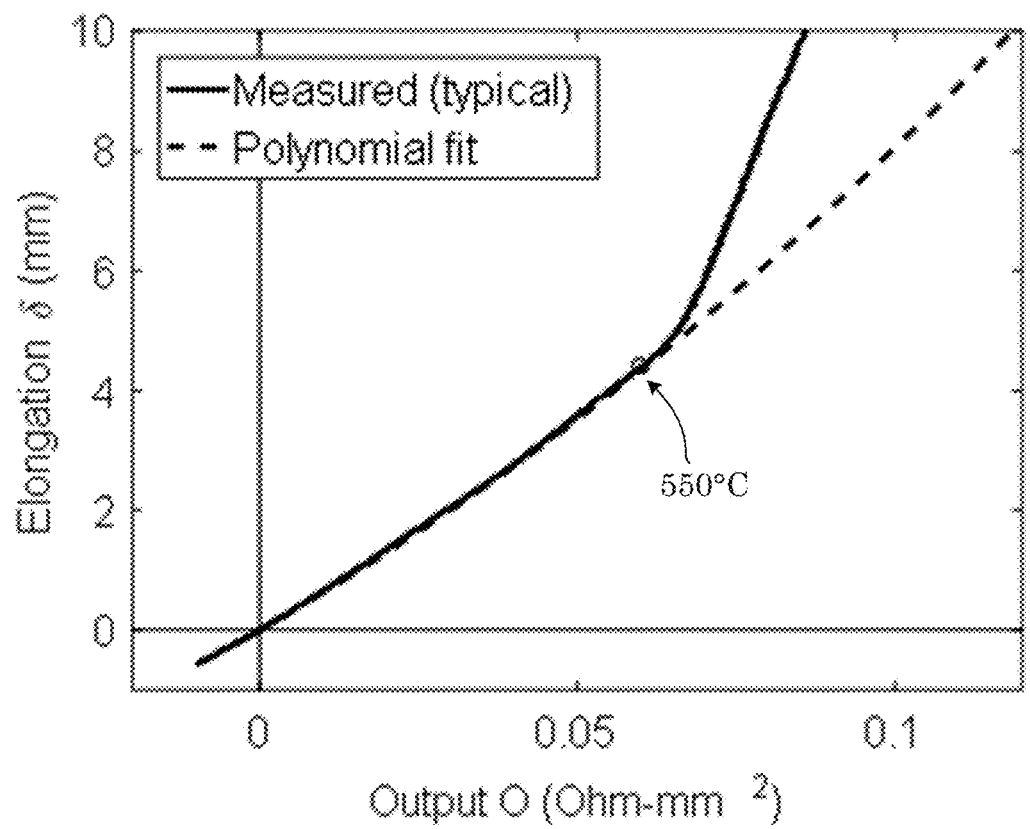
FIG. 11 shows a graph of elongation versus ouptut for a resistance compensator.

Prior to using the resistance compensator 100, probe line 2 must be calibrated one time to determine the relation between elongation of the probe line and the change in resistance in response to temperature. The can be accomplished by spanning probe line 2 through a calibrated thermal field 60, whereby the both attachment 14 and junction 16 are located outside of the thermal field 60. An example of the results of such a calibration is shown in FIG. 11 where elongation of the probe line 2 is shown on the vertical axis and variation of resistance times the cross sectional area of probe line 2 (Output O) is shown on the horizontal axis. Here, first probe line 2 is subjected to a temperature from 23° C. to 1000° C., and resistance probe 6 produced probe signal 14 (plotted as Output O along the x-axis), from which elongation of probe line 2 produced by displacement member 4 is determined (plotted as Elongation δ along the y-axis). For this particular first probe line, the relation between elongation (i.e., expansion of the first probe line) versus temperature and probe signal is substantially linear from 23° C. to 550° C. It should be appreciated that selecting the material for first probe line 2 can be based upon a desired temperature range over which first probe line 2 has a linear coefficient of thermal expansion. In an embodiment, ceramic fibers are used for probe lines. Ceramic fibers can include silicon-carbide and aluminum-oxide fibers for temperatures in excess of 1000° C. A linear or polynomial fit of the data up to the temperature where bifurcation of the curve occurs, in this example 550° C., is typically sufficient to characterize the response of probe line 2.

In the process, determining the movement or displacement of structural member 50 can be accomplished from formula 1.

$$D1=D2-f(O) \qquad (1)$$

Resistance compensator 100 has numerous beneficially and advantageous properties. Beneficially, resistance compensator 100 provides measurement of thermal expansion in probe lines that interconnect displacement members to structural members. Advantageously and unexpectedly, the articles and methods herein reduce uncertainty in determinations of properties discussed to less than 1 mm/m at various temperatures.

Resistance compensator 100 can be operated over many temperatures such as a temperature over which probe lines maintain their integrity and linearity of thermal expansion with respect to temperature. With reference to FIG. 11, material for first probe line 2 can be selected to so that resistance compensator 100 has a linear response over a selected range of temperatures.

Accurate and reliable measurements of the displacement of structural member 50 in fire tests provide understanding of a physical response of structural member 50 to elevated temperatures and stresses. Differential compensator 100 overcomes challenges involved with measuring displacement of structural member 50 in large-scale tests where the displacements to be measured may be located within a heated test zone. Conditions can include time-varying gas temperatures, e.g., from 20° C. to 1400° C., sustained structural member temperatures up to 750° C., as well as in a presence of flame or soot that obscures optical visibility.

The articles and processes herein are illustrated further by the following Example, which is non-limiting.

EXAMPLE

Determination of Displacement.

Figure 12:
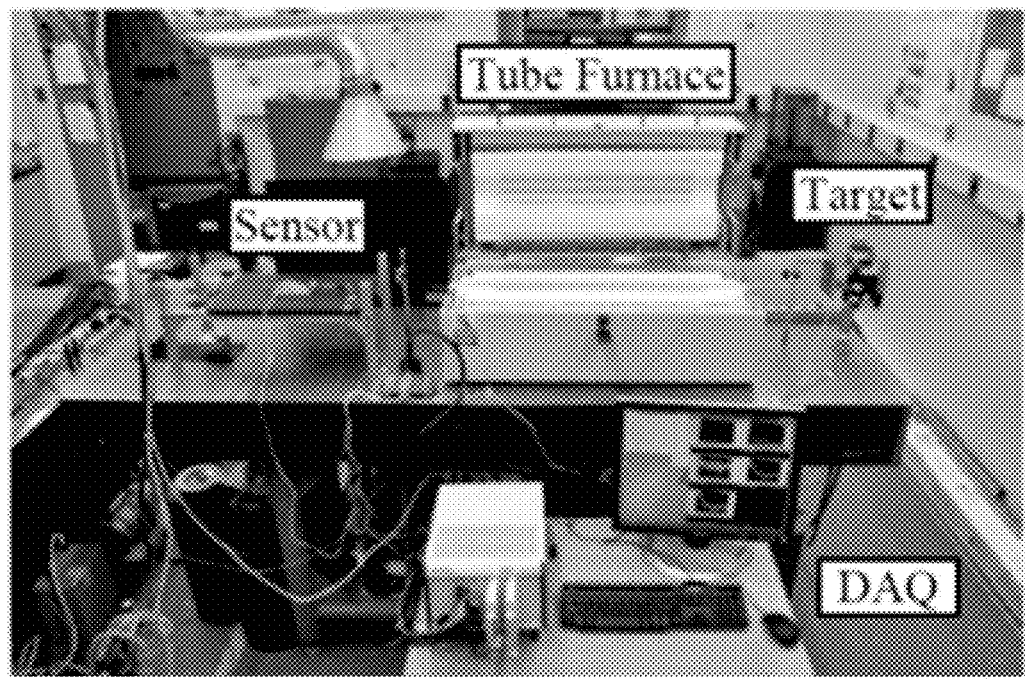
FIG. 12 shows a laboratory configuration that includes a resistance compensator connected to a structural member.
Figure 13:
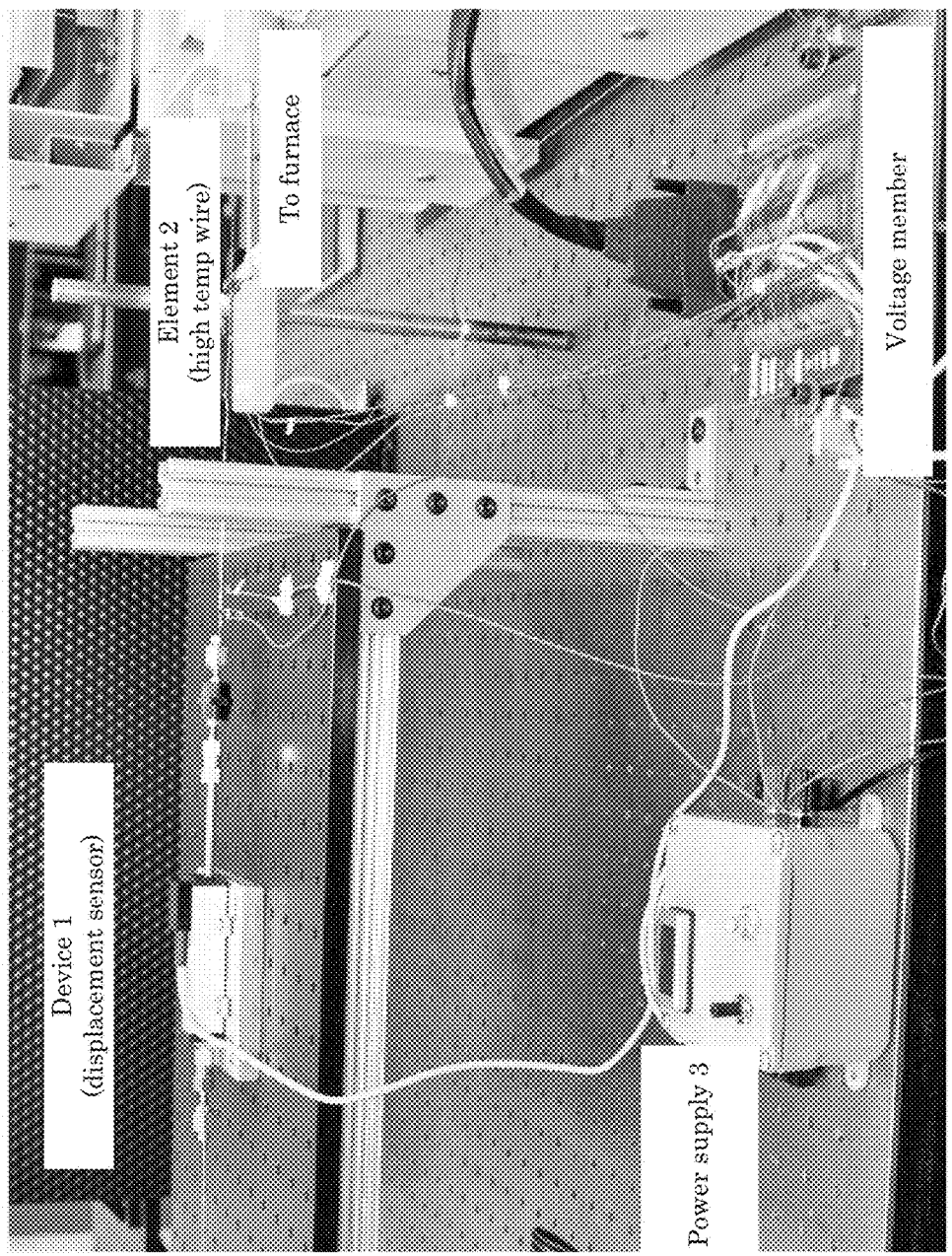
FIG. 13 shows a a laboratory configuration that includes a resistance compensator connected to a structural member.

FIG. 12 shows a test setup in which a structural member (labelled as Target), a tube furnace, a displacement member (linear potentiometer), and a data acquisition system (DAQ) interacted for determination of displacement of the target. A probe line made of a nickel-chromium super alloy approximately 1.5 m in length and 1 mm in diameter was attached to the target on the right and to the displacement sensor on the left. The wire passed through the tube furnace over a length of about 0.66 m. The power supply was attached to the wire to the right and to the left of the tube furnace with alligator clips and supplied a constant current to the wire. A voltage member measured the voltage across the positive and negative poles of the power supply. FIG. 13 shows enhanced detail of the sensor end of the setup. A constant tension was applied to the probe line using pull and mass attached to the rear of the linear potentiometer.

The displacement member was electrically connected to a data acquisition system (DAQ) for acquisition of the displacement signal from the displacement member. In this example, the linear potentiometers were fixed in space relative to the structural member and the structural member was stationary. Thus the displacement registered at the displacement member could be used to determine the displacement error (relative to zero displacement of the stationary target) of this displacement compensator.

The measurements from the wire and voltage member were recorded using a data acquisition (DAQ) system. The temperature of the tube furnace was increased from 23° C. to 1000° C.

Figure 14:
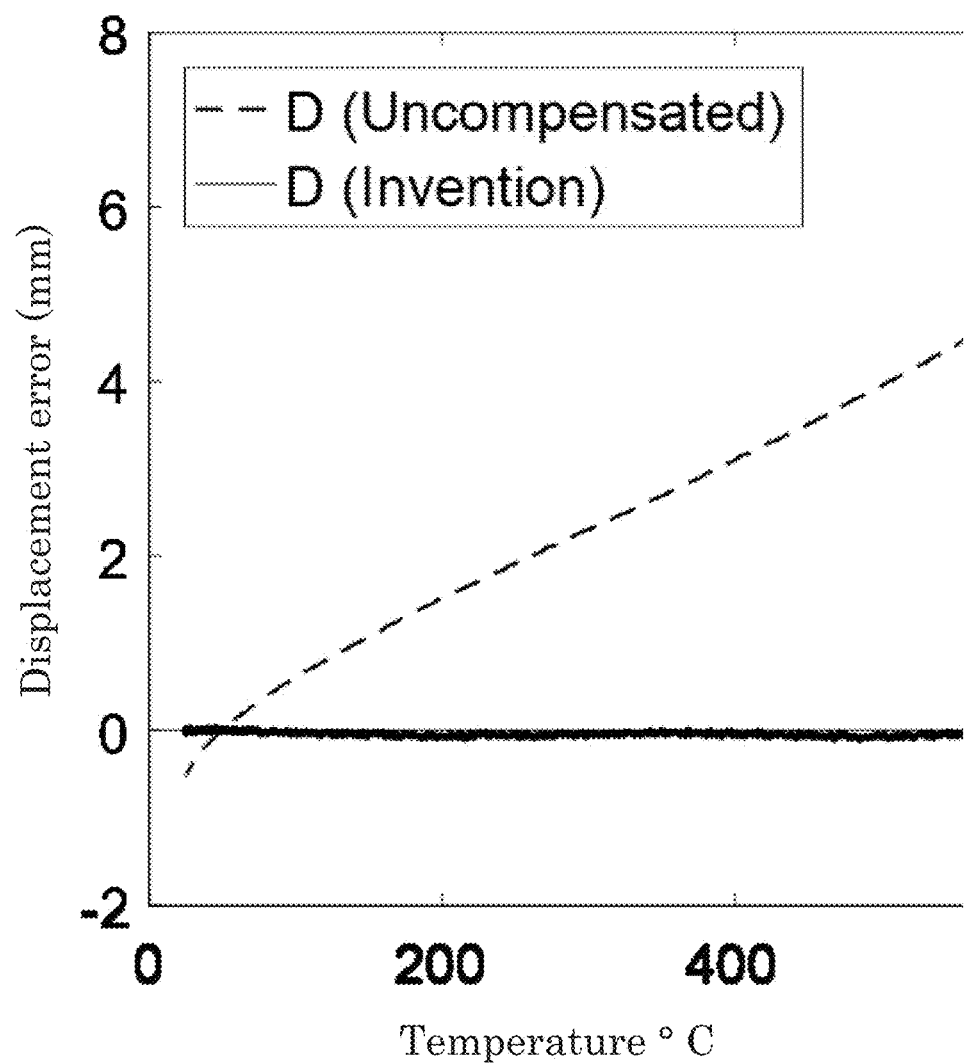
FIG. 14 shows a a graph of displacement error versus temperature.

During testing the temperature in the tube furnace was raised from 23° C. to 1000° C. over several minutes and then cooled to 23° C. over several hours. The displacement measured by the linear potentiometer was designated D (uncompensated). The displacement error for displacement sensor with and without the applied correction using output O from the voltage member are shown in FIG. 14. Since the target remained stationary, the target displacement should be exactly zero over the entire heating range. In this example, the maximum deviation from zero for the corrected output up to 550° C. is 0.2 mm. Compared to the uncorrected measurement there is about a reduction of error of more than 90%. Beyond 550° C. the relationship between D and O is nonlinear for the wire (refer to FIG. 11) so the corrected reading is no longer valid.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A resistance compensator to reduce uncertainty in determination of movement of a structural member, the resistance compensator comprising:
   a first probe line to attach to the structural member at a point of attachment of the first probe line and to provide a first combination of displacement of the structural member and an expansion of the first probe line in response to movement of the structural member and expansion of the first probe line;
   a second probe line connected to the first probe line and in electrical communication with the first probe line;
   a resistance probe in electrical communication with the first probe line and the second probe line to provide a probe signal that depends on a resistance of the first probe line, wherein the resistance probe is connected to the first probe line at a probe junction; and
   a displacement member in mechanical communication with the first probe line, the displacement member to:
      receive the first combination of displacement of the structural member and the expansion of the probe line from the first probe line; and
      produce a displacement signal comprising the displacement of the structural member, the expansion of the first probe line, or a combination comprising at least one of the foregoing.

2. The resistance compensator of claim 1, wherein the resistance probe comprises:
   a power source in electrical communication with the second probe line and the first probe line, the power source to electrically bias the first probe line; and
   a voltage member in electrical communication with the power source to:
      measure a potential difference across the power source, and
      produce the probe signal based on the potential difference.

3. The resistance compensator of claim 1, wherein the resistance probe comprises:
   a power source in electrical communication with the second probe line and the first probe line, the power source to provide electric current through the first probe line; and
   a current member in electrical communication with the power source and the first probe line to:
      measure the electric current through the first probe line, and
      produce the probe signal based on the electric current through the first probe line.

4. The resistance compensator of claim 1, further comprising:
an attachment fastener to receive the first probe line and the second probe line and to attach the first probe line and the second probe line to the structural member.

5. The resistance compensator of claim 1, further comprising:
a coupler to receive the first probe line and to mechanically couple the first probe line to the displacement member.

6. The resistance compensator of claim 1, wherein the first probe line comprises a coefficient of thermal expansion that is a linear and positive function of temperature.

7. The resistance compensator of claim 6, wherein a structure, a composition, and the coefficient of thermal expansion of the first probe line remain constant from a temperature from −100° C. to 1500° C.

8. The resistance compensator of claim 7, wherein the first probe line and the second probe line independently comprise an electrically conductive material comprising a metal, a glass, a ceramic, a polymer, or a combination comprising at least one of the foregoing electrically conductive materials.

9. The resistance compensator of claim 1, wherein the displacement member comprises:
a transducer member in mechanical communication with the first probe line to produce the displacement signal in response to receipt of the first combination of displacement of the structural member and the expansion of the first probe line; and
a tension member in mechanical communication with the first probe line to preload and to maintain a tension that is constant and provided to the first probe line when the first probe line is attached to the structural member.

10. The resistance compensator of claim 1, wherein the displacement member remains in a fixed position as the structural member moves during receipt of the first combination of displacement of the structual member and the expansion of the first probe line from the first probe line.

11. A resistance compensator to reduce uncertainty in determination of movement of a structural member, the resistance compensator comprising:
a first probe line to attach to the structural member at a point of attachment of the first probe line and to provide a first combination of displacement of the structural member and an expansion of the first probe line in response to movement of the structural member and expansion of the first probe line;
a second probe line connected to the first probe line and in electrical communication with the first probe line;
a resistance probe in electrical communication with the first probe line and the second probe line to provide a probe signal that depends on a resistance of the first probe line, wherein the resistance probe is connected to the first probe line at a probe junction and comprises:
a power source in electrical communication with the second probe line and the first probe line, the power source to electrically bias the first probe line, and
a voltage member in electrical communication with the power source to measure a potential difference across the power source, and to produce the probe signal based on the potential difference; or
a power source in electrical communication with the second probe line and the first probe line, the power source to provide electric current through the first probe line, and
a current member in electrical communication with the power source and the first probe line to measure the electric current through the first probe line and to produce the probe signal based on the electric current through the first probe line;
a displacement member in mechanical communication with the first probe line, the displacement member to:
receive the first combination of displacement of the strutural member and an expansion of the first probe line from the first probe line; and
produce a displacement signal comprising the displacement of the structural member, the expansion of the first probe line, or a combination comprising at least one of the foregoing;
an attachment fastener to receive the first probe line and the second probe line and to attach the first probe line and the second probe line to the structural member; and
a coupler to receive the first probe line and to mechanically couple the first probe line to the displacement member.

12. The resistance compensator of claim 11, wherein the first probe line comprises a coefficient of thermal expansion that is a linear and positive function of temperature.

13. The resistance compensator of claim 11, wherein a structure, a composition, and the coefficient of thermal expansion of the first probe line remain constant from a temperature from −100° C. to 1500° C.

14. The resistance compensator of claim 11, wherein the first probe line and the second probe line independently comprise a metal, a glass, a ceramic, or a combination comprising at least one of the foregoing materials.

15. The resistance compensator of claim 11, wherein the displacement member comprises:
a transducer member in mechanical communication with the first probe line to produce the displacement signal in response to receipt of the first combination of displacement of the structural member and the expansion of the first probe; and
a tension member in mechanical communication with the first probe line to preload and to maintain a tension that is constant and provided to the first probe line when the first probe line is attached to the structural member.

16. The resistance compensator of claim 11, wherein the displacement member remains in a fixed position as the structural member moves during receipt of the first combination of displacement of the structural member and the expansion of the first probe line from the first probe line.

17. A process for determining movement of a structural member, the process comprising:
attaching a resistance compensator of claim 2 to the structural member;
providing a voltage from the power source to electrically bias the first probe line;
measuring, by the voltage member, a potential difference across the power source;
producing, by the voltage member, the probe signal based on the potential difference;
mechanically communicating the first combination of displacement of the structural member and an expansion of the probe line from the first probe line to the displacement member;
receiving, by the displacement member, the first combination of displacement of the structural member and the expansion of the first probe line from the first probe line;
producing, by the displacement member, a displacement signal in response to receiving the first combination of displacement of the structural member and the expansion of the first probe line; and analyzing the displacement signal and the probe signal to determine the movement of the structural member.

18. The process for determining movement of a structural member of claim 17, wherein the coefficient of thermal expansion of the first probe line is a linear and positive function of temperature;
- a structure, a composition, and the coefficient of thermal expansion of the first probe line remain constant from a temperature from −100° C. to 1500° C.; and
- the displacement member remains in a fixed position as the structural member moves during receipt of the first combination of displacement of the structural member and the expansion of the first probe line from the first probe line.

19. A process for determining movement of a structural member, the process comprising:
- attaching a resistance compensator of claim 3 to the structural member;
- providing the electric current from the power source to the first probe line;
- measuring, by the current member, the electric current through the first probe line;
- producing, by the current member, the probe signal based on the electric current through the first probe line;
- mechanically communicating the first combination of displacement of the structural member and the expansion of the first probe line from the first probe line to the displacement member;
- receiving, by the displacement member, the first combination of displacement of the structural member and the expansion of the first probe line from the first probe line;
- producing, by the displacement member, a displacement signal in response to receiving the first combination of displacement of the structural member and the expansion of the first probe line; and
- analyzing the displacement signal and the probe signal to determine the movement of the structural member.

20. The process for determining movement of a structural member of claim 19, wherein the coefficient of thermal expansion of the first probe line is a linear and positive function of temperature;
- a structure, a composition, and the coefficient of thermal expansion of the first probe line remain constant from a temperature from −100° C. to 1500° C.; and
- the displacement member remains in a fixed position as the structural member moves during receipt of the first combination of displacement of the structural member and the expansion of the first probe line from the first probe line.

* * * * *